Aug. 2, 1955

R. F. TABER 2,714,307

INSTRUMENT FOR MEASURING THE PROPERTIES
OF MATERIALS IN FLEXURE

Filed Oct. 22, 1954

INVENTOR.
RALPH F. TABER
BY
ATTORNEY

Aug. 2, 1955 R. F. TABER 2,714,307
INSTRUMENT FOR MEASURING THE PROPERTIES
OF MATERIALS IN FLEXURE
Filed Oct. 22, 1954 11 Sheets-Sheet 3

INVENTOR.
RALPH F. TABER
BY
ATTORNEY

Aug. 2, 1955 — R. F. TABER — 2,714,307
INSTRUMENT FOR MEASURING THE PROPERTIES OF MATERIALS IN FLEXURE
Filed Oct. 22, 1954 — 11 Sheets-Sheet 4

INVENTOR.
RALPH F. TABER
BY
ATTORNEY

Aug. 2, 1955

R. F. TABER 2,714,307

INSTRUMENT FOR MEASURING THE PROPERTIES
OF MATERIALS IN FLEXURE

Filed Oct. 22, 1954

INVENTOR.
RALPH F. TABER
BY
ATTORNEY

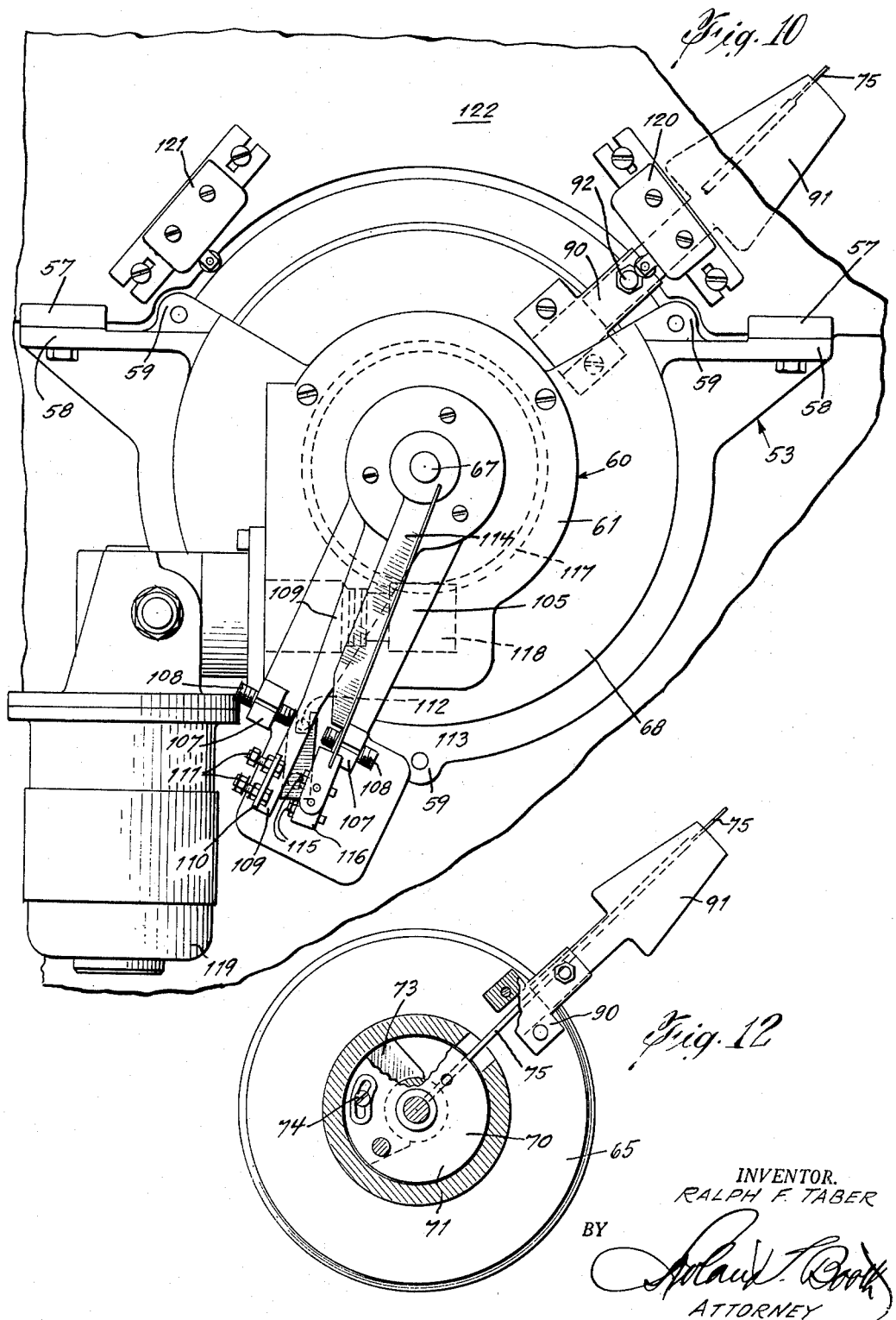

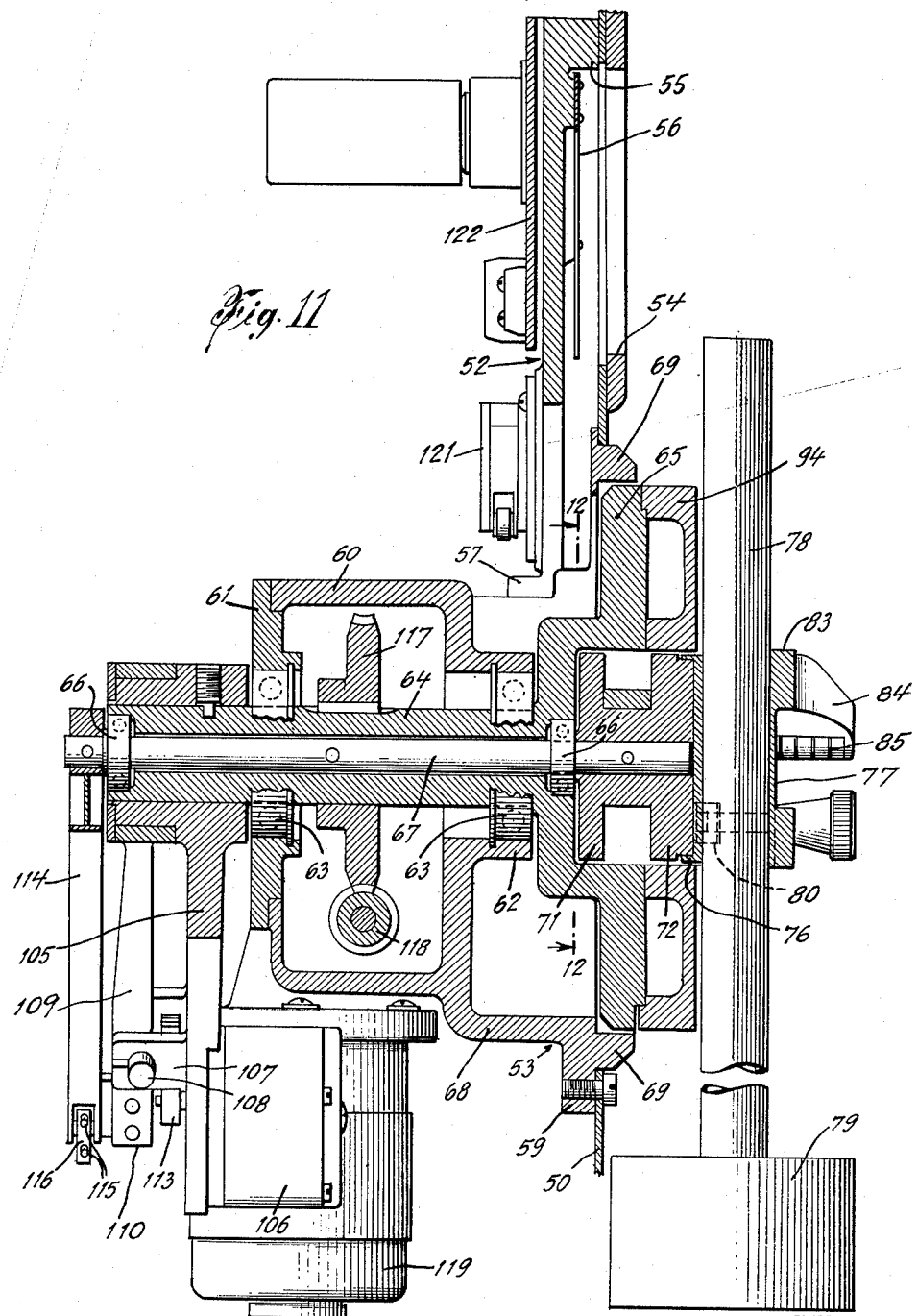

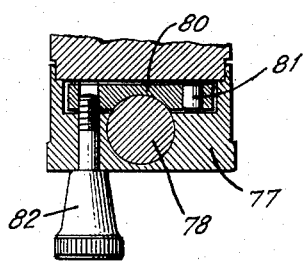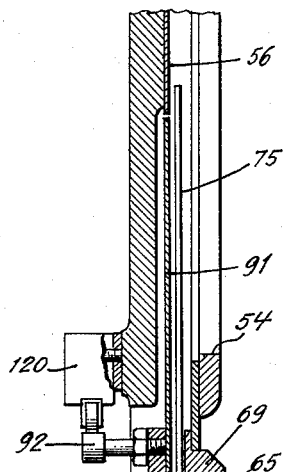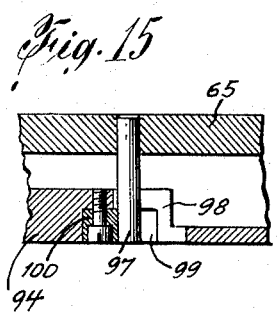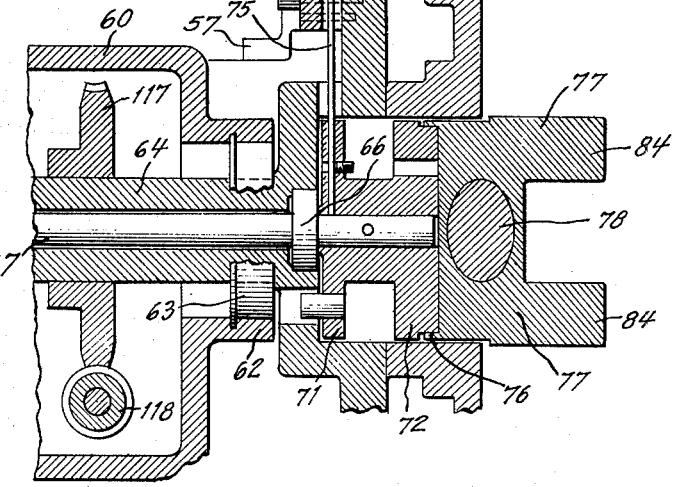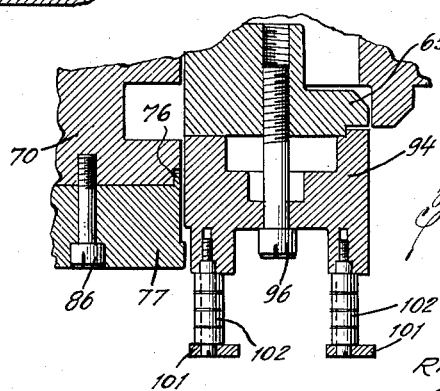

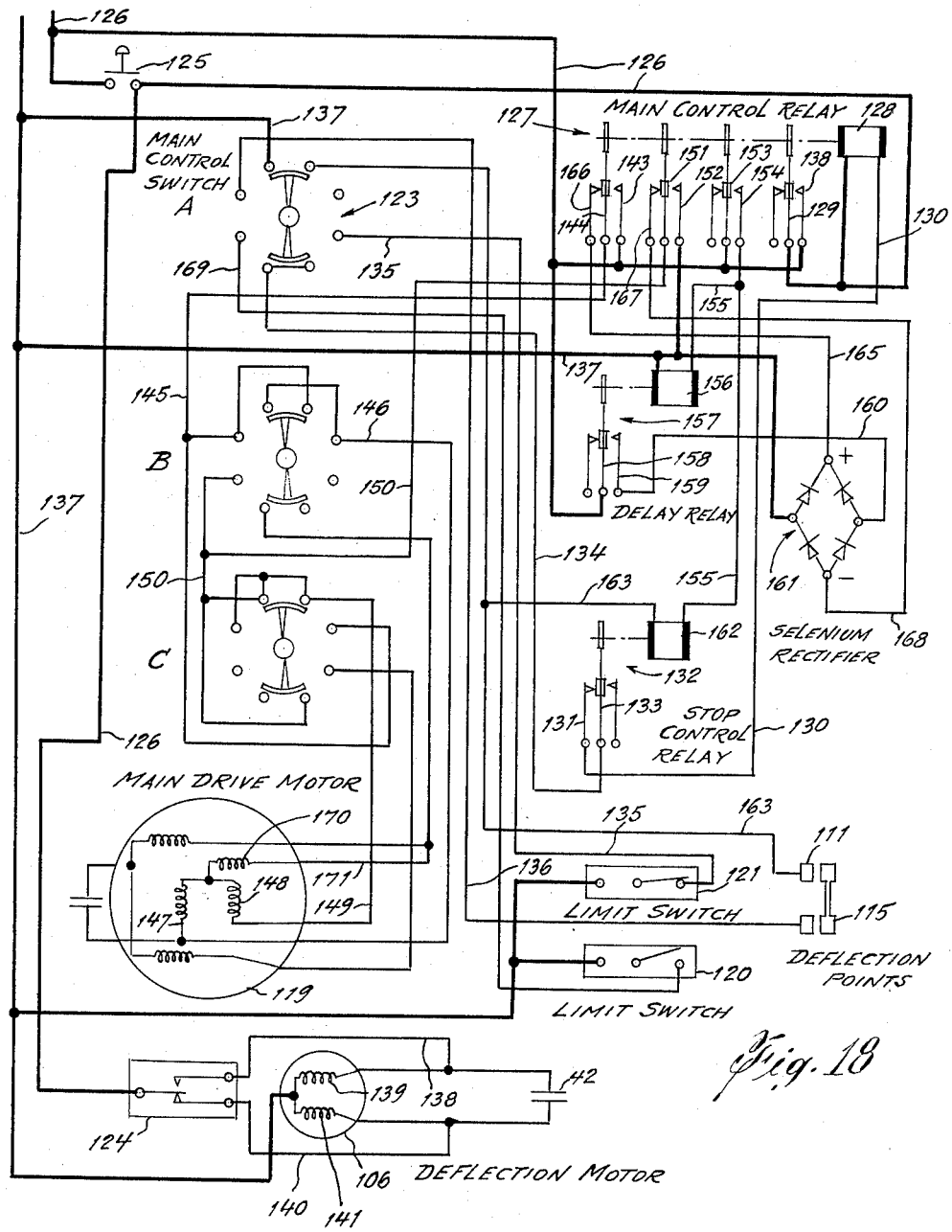

Aug. 2, 1955
R. F. TABER
2,714,307
INSTRUMENT FOR MEASURING THE PROPERTIES
OF MATERIALS IN FLEXURE
Filed Oct. 22, 1954
11 Sheets-Sheet 11
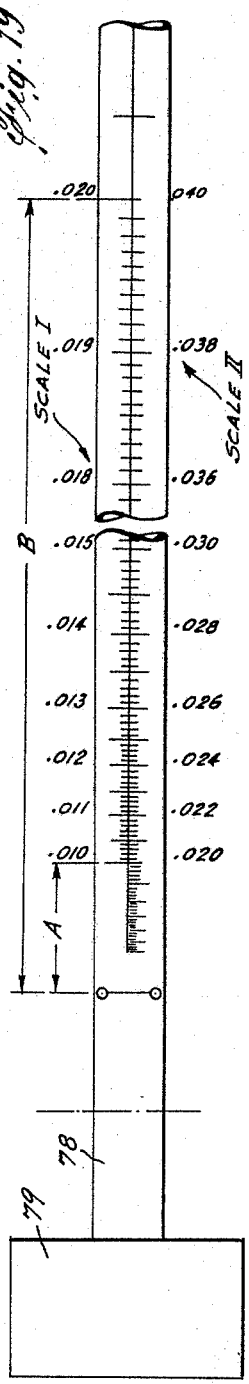
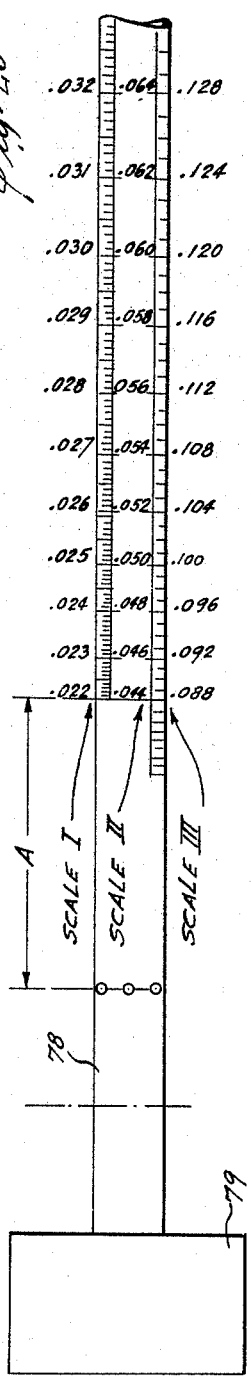
Fig. 21
| SPECIMEN | SIZE | | PENDULUM | | DEFLECTION SWITCH | RESULT |
|---|---|---|---|---|---|---|
| | THICKNESS | WIDTH | LENGTH | WT | SCALE | |
| METALLIC | .010-.023 | 1.000 | 4.25 INCH | 1 KG. | LEFT | 2 MM | DIRECT DIAL READING |
| | .022-.040 | 1.000 | 4.25 INCH | 5 KG. | LEFT | 2 MM | |
| | .040-.081 | 1.000 | 8.25 INCH | 5 KG. | CENTER | 1 MM | |
| NON-METALLIC | .014-.046 | 1.000 | 4.25 INCH | 1 KG. | RIGHT | 2 MM | DIVIDE BY 8 |
| | .040-.081 | 1.000 | 4.25 INCH | 5 KG. | CENTER | 2 MM | |
| | .080-.163 | 1.000 | 8.25 INCH | 5 KG. | RIGHT | 1 MM | |
INVENTOR.
RALPH F. TABER
BY
ATTORNEY _United States Patent Office_

2,714,307
Patented Aug. 2, 1955

2,714,307

INSTRUMENT FOR MEASURING THE PROPERTIES OF MATERIALS IN FLEXURE

Ralph F. Taber, North Tonawanda, N. Y.

Application October 22, 1954, Serial No. 464,125

10 Claims. (Cl. 73—100)

The invention relates to improvements in apparatus for testing and measuring the properties of sheet materials in flexure, such as paper, cardboard, fibrous materials, leather, imitation leather, metal foils, filaments, spring wire strips, textiles, sheet metal and other materials.

The invention in this application is an improvement on the invention disclosed in Patents 2,465,180, March 22, 1949; 2,113,389, April 5, 1938; and 2,063,275, December 8, 1936.

The invention provides an apparatus for flexing a test specimen by engaging a length of test material with two pairs of engaging elements arranged in spaced parallel relation and operable to flex the test specimen in opposite directions on opposite sides of the central portions into a substantial S-shape and then register the composite elastic properties on a scale when flexed a given amount. By using an S-shape deflection of the specimen, the invention provides a testing instrument where the test specimen is free to flex at all portions of its length, without restriction and with flexing in both directions to give a composite indication in one reading on the scale of the elastic properties of the specimen.

The invention provides for setting the testing instrument so the test specimen engaging elements are positioned to compensate for the thickness of the specimen while the indicating means remains at the starting position. The test specimen is thus positioned in an unstressed position in the testing instrument when all parts of the instrument are in the starting position.

The invention provides an instrument that will directly register on a scale the modulus of elasticity of a test specimen. This is produced by a pair of relatively movable members, each having a pair of spaced parallel specimen engaging elements for flexing opposite ends of a specimen in opposite directions. At least one of the members has means providing for the adjustment of the specimen engaging elements relative to the elements on the other members according to the thickness of the specimen. Also, one of the members has a variable force which retards movement of one member relative to the other proportionately to a multiple of specimen thickness for directly registering on a scale the modulus of elasticity of a specimen on a scale when flexed a given amount.

The invention further provides an attachment for the testing instrument shown in Patent No. 2,465,180 wherein the attachment provides two pairs of specimen engaging elements mounted on the relatively movable members to receive a test specimen, which are adjustable to compensate for specimen thickness, and are operable in relative movement of the members to flex opposite ends of the specimen in opposite directions into S-shape and register the composite properties of the test specimen on a scale when the specimen is flexed a given amount. The attachment eliminates clamping of the specimen and allows free flexing of the specimen at all points throughout its length. This obtains improved results and saves time in the operation of the tester.

Another feature of the invention is a testing instrument having a pair of members mounted for rotation on a common axis with drive and pendulum heads attached to the members so that one is adjustable relative to the other according to specimen thickness, while the members carry deflection indicating means which remain in the same position. The heads carry specimen engaging elements for supporting and flexing a specimen in relative movement into S-shape for indicating the elastic properties of the specimen when flexed a given amount. The pendulum head carries a weight having its shaft adjustable in the head to vary the length of the shaft proportionately to a multiple of specimen thickness, so that the modulus of elasticity will be directly registered on a scale.

According to the invention the testing instrument has a pair of members each independently mounted for rotation about the other on a common axis. One member has a pendulum head provided with at least one pair of specimen engaging elements and means for adjustably securing a pendulum shaft thereto with a weight on one end for normally maintaining one of the members in a given position of rest. This pendulum member has a deflection pointer attached thereto and cooperating with a scale and a counter-balancing means for balancing the member in a position so that the deflection pointer will normally indicate zero on the scale. The pendulum member is formed for cooperation with the pendulum shaft to indicate the length of the pendulum proportionately to a multiple of the thickness of a test specimen. The other member is provided with an annular drive head provided with at least one pair of drive elements arranged in spaced parallel relation to the elements on the pendulum head so that the elements will contact and support a test specimen therebetween. The drive head is adjustably mounted on the drive member and has cooperating portions on both the drive head and member for gauging the adjustment of the drive head on the drive member so that it can be set in position according to the thickness of a test specimen. Thus adjustment is made in order that a deflection indicator operated by the drive member will have its indicator mark normally remain at the zero position until an actual test on a specimen is made. Provision is made for testing specimens over a relatively wide range of thicknesses and for this purpose two sets of rollers are provided on both the pendulum head and the drive head to cover test specimens having different ranges of thickness. The deflection indicator has deflection indicator marks for the two ranges for deflection of specimens and two different pendulums are provided with a plurality of scales thereon for positioning the pendulum weight at the desired distance from the axis of the rotation of the members so that the modulus of elasticity may be registered on the scale when the test specimen has been flexed a given amount.

The tester is constructed for power operation by a reversible electric motor drive with control switches for limiting the movement of the drive member to stop the motor whenever the drive member has completed a given amount of rotative movement during a test operation. The pendulum member has a shaft extension carrying control contacts cooperating with contact means on the drive member with motor-operated adjustment of the contact means for initially placing the contacts in position for one of the two ranges of testing of the instrument, while manually-operated switches control the setting of the circuits to the motors for starting a test operation and resetting the members at the starting position.

In the drawings:

Fig. 1 is a front elevation of a testing instrument with the attachment applied thereto having a pair of spaced parallel specimen engaging elements on the pendulum head and a pair of spaced parallel specimen engaging elements on a drive member detachably mounted on a drive disc for the instrument and showing the parts in position with a test specimen flexed into substantial S-shape to a fifteen degree angle.

Fig. 6 is an enlarged fragmentary diagrammatic front elevation showing the portions of the attachment which engage and flex a specimen in opposite directions on opposite sides of the central portion into substantial S-shape.

Fig. 10 shows the testing mechanism as illustrated in Fig. 8 in rear elevation, with portions broken away for convenience in illustrating details of construction.

Fig. 11 is a vertical transverse cross-section taken on line 11—11 of Fig. 8 with portions broken away for convenience in illustrating details of construction.

Fig. 12 is a cross-section taken on line 12—12 of Fig. 11 to illustrate the mounting of deflection pointer on the pendulum hub and the deflection indicator on the drive member, portions being broken away and shown in cross-section, the figure also illustrating the adjustable counter-balancing weight on the pendulum hub.

Fig. 13 is a cross-section taken on line 13—13 of Fig. 8, to illustrate the details of construction of the portion of the testing mechanism carrying the drive and pendulum members and the mounting of the deflection pointer and indicator.

Fig. 14 is an enlarged detailed cross-section taken on line 14—14 of Fig. 8 showing one of the manually-operated clutch bars for retaining the pendulum shaft in adjusted position in the pendulum head.

Fig. 15 shows a cross-section through the drive member taken on line 15—15 of Fig. 8 illustrating the construction of the gage pin and gage bar structure for adjusting the drive head relative to the deflection indicator to compensate for variations in thickness of the test specimens.

Fig. 16 is a cross-section taken on line 16—16 of Fig. 8, illustrating details of construction of the specimen engaging elements on one side of the pendulum.

Fig. 17 is a cross-section taken on line 17—17 of Fig. 8, showing the details of construction of the specimen engaging elements at the one side of the drive head and the manner in which the drive head is secured to the annular flange on the drive member.

Fig. 18 is a wiring diagram showing the connections between the main control switch, deflection selector switch, push button starting switch, relays, and deflection control switches, used for automatically controlling the operation of the instrument in testing a specimen through power operation of the relatively movable members.

Fig. 19 is a view of the 1000 kilogram pendulum partially showing the two scales thereon diagrammatically and illustrating how the scales are laid off on the pendulum shaft.

Fig. 20 is a view of the 5000 kilogram pendulum partially showing the three scales applied to the pendulum shaft.

Fig. 21 shows the chart for illustrating the use and adjustment of the pendulum shafts in testing difficult types of specimens of different thickness.

Figure 1:
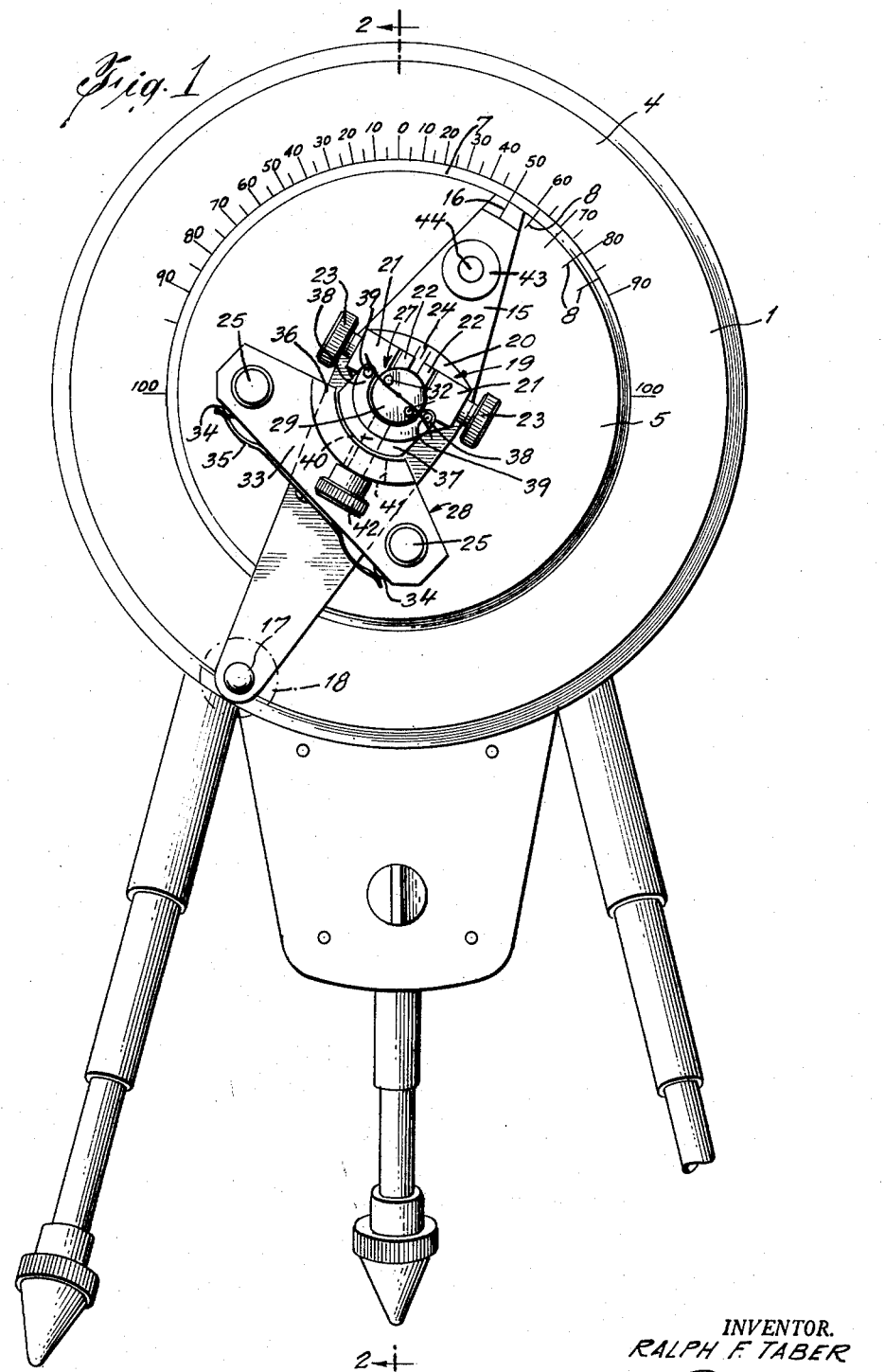
Figure 2:
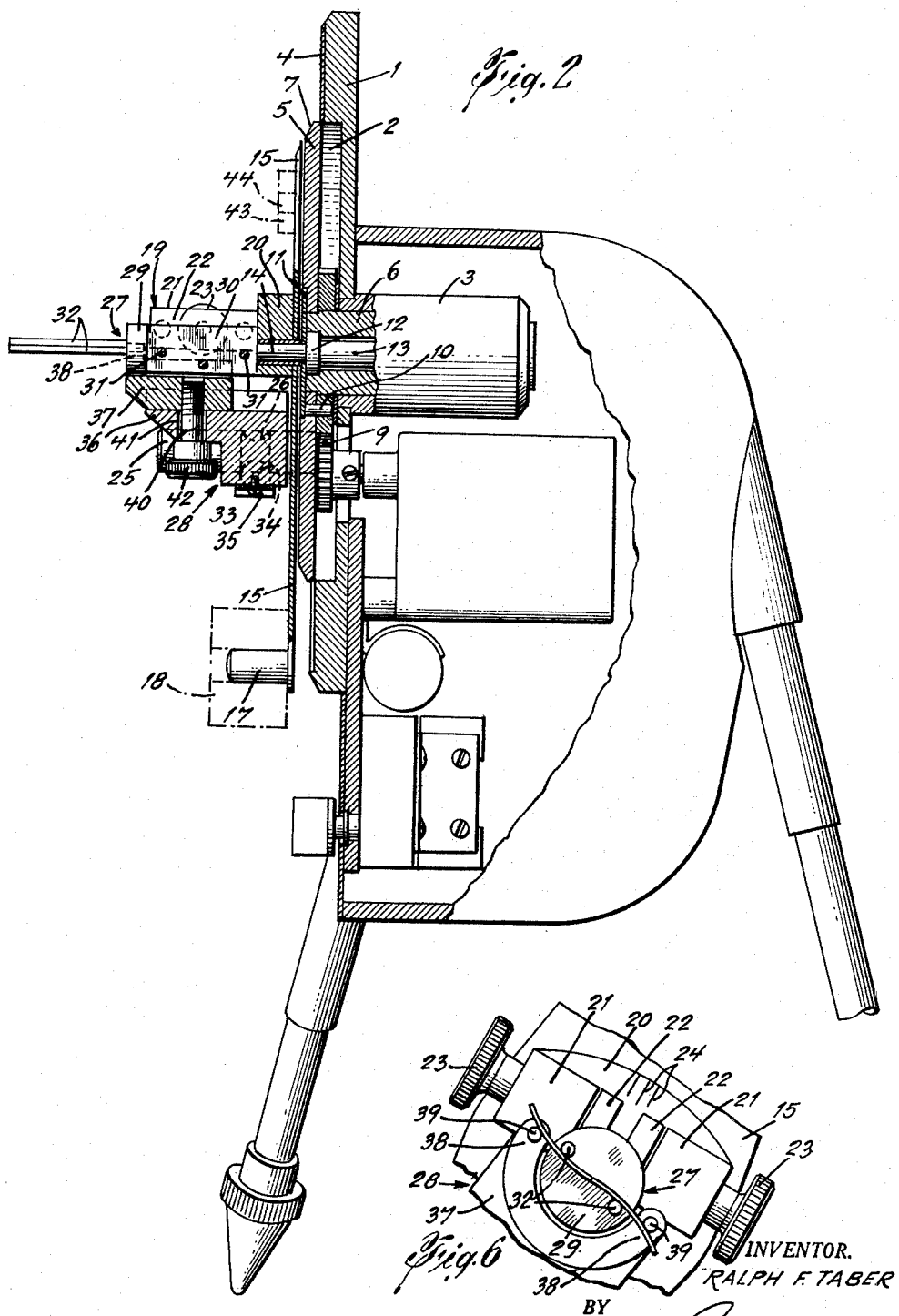
Fig. 2 is a vertical transverse cross-section taken on line 2—2 of Fig. 1 with the pendulum, driving disc and the attachments carried thereby, shown in the central neutral position.

A scale plate 1 of circular form has a central annular recess 2 formed in the front face thereof and a bearing sleeve 3 mounted in the center of plate 1 at one end and projecting rearwardly therefrom, as clearly shown in Fig. 2. The front face of scale plate 1 about recess 2 has a scale ring 4 rigidly mounted thereon. Scale ring 4 is provided with a plurality of graduations arranged in radial relation about the inner arcuate margin thereof, as shown in Fig. 1. These graduations extend about the upper half of ring 4 and have a zero point on the scale in the vertical plane of the axis of the ring.

A driving disc 5 carries a centrally arranged bearing sleeve 6 projecting rearwardly therefrom and rotatably engaged in bearing sleeve 3 for rotatably mounting disc 5 in front of scale plate 1 with the rear portion received in recess 2 in the manner shown in Fig. 2. The periphery of disc 5 is beveled in advance of scale ring 4, as indicated at 7. Indicating means in the form of a plurality of radial marks 8 are provided at predetermined positions on bevel portion 7 of driving disc 5 and the adjacent front face of the disc. The central mark 8 is arranged to align with the zero point on the scale provided on scale ring 4, as shown in Fig. 1, when a test specimen is in unstressed position. The marks on the disc at opposite sides of this central mark of the group are arranged at 7½° and 15° angles, respectively, relative to this central mark. These marks 8 register with the radial marks forming the scale on the scale ring carried by scale plate 1 for cooperation therewith in a manner that will hereinafter be described.

The rear face of driving disc 5 is spaced from the bottom of recess 2, as shown in Fig. 2, to accommodate driven member or gear 9 mounted on bearing sleeve 6 against the rear face of disc 5. One or more pins 10 retain driven gear 9 against rotation relative to disc 5 and provide the means for transmitting rotative movement applied to gear 9 for rotating disc 5 in the operation of the instrument. The central portion of driving disc 5 is provided with a recess in the front face for receiving bearing retainer 11 adapted to retain a ball bearing member 12 in a recess in the front end of bearing sleeve 6.

A shaft 13 has a reduced extension on the forward end thereof mounted in bearing 12 with a shoulder formed by the reduced extension engaging the rear face of bearing 12. Reduced extension 14 extends through bearing 12 and an opening in bearing retainer 11 and rigidly mounts pendulum 15 on the forward end thereof. Pendulum 15 is formed of a flat metal strip extending diametrically across driving disc 5 in contiguous but slightly spaced relation, as clearly shown in Figs. 1 and 2. The upper end of pendulum 15 is provided with a beveled portion terminating adjacent bevel 7 on the periphery of disc 5, having an indicator mark 16 thereon arranged in radial relation for alignment and registry with marks 8 on disc 5 and the marks on scale ring 4. The opposite end of pendulum 15 extends below the lower peripheral portion of driving disc 5 and carries a forwardly projecting stud 17 for detachably receiving one of a plurality of weights.

The central portion of pendulum 15 carries a specimen clamp of U-shaped construction having base 20 secured to the front face of the pendulum strip with arms 21 extending forwardly from the strip in spaced perpendicular relation and having the lower edges arranged in the plane of the axis of driving disc 5 and scale plate 1. Clamping bars 22, one for each arm 21, are provided with guide pins slidably mounting bars 22 on arms 21, while clamping screws 23 threaded in arms 21 are manually operable to move clamping bars 22 toward and from each other between arms 21 in clamping and releasing test specimens therebetween. Indicator marks 24 are provided on base 20 of specimen clamp 19 at the upper portion, as shown in Fig. 1, as a guide for aiding in clamping a test specimen between clamping bars 22 in a center position in the plane of the axis of the driving disc. The reduced extension 14 on shaft 13 extends through base 20 of specimen clamp 19. The strip forming pendulum 15 is secured to base 20 of specimen clamp 19 and a set screw in base 20 provides a convenient means for rigidly securing the pendulum and specimen clamp on shaft 13.

A pair of cylindrical studs 25 are mounted in spaced parallel relation on the lower portion of driving disc 5 and extend forwardly in perpendicular relation. These studs are formed with annular grooves 26.

The structure described above and shown in Figs. 1–6 discloses a stiffness testing instrument of the character shown and described in Figs. 1–5 of Patent No. 2,465,180, hereinabove mentioned.

The present invention provides an attachment for this instrument. This attachment has a pendulum head forming one of a pair of relatively movable members indicated at 27, while the other movable member provides a driving member indicated at 28. Pendulum head 27 has a disc portion 29 and a shank 30 extending rearwardly therefrom for engagement between clamping bars 22 on arms 21 of the pendulum member, with the axis of the disc portion in coaxial relation with the pendulum member 15. A pair of positioning pins 31 extend transversely through shank 30 at the front rear portions thereof and beyond opposite sides. Pins 31 are mounted in shank 30 to accurately position disc portion 29 and the pendulum head between clamping bars 22 so that the pendulum head can be quickly applied and clamped in coaxial position in the instrument. A pair of specimen engaging elements 32 in the form of pins or rods each have one end mounted in disc portion 29 while the remaining portions project forwardly in spaced parallel relation to the axis of the pendulum and in equidistant relation to said axis on opposite sides thereof, as clearly shown in Figs. 1 and 3 of the drawings.

Driving member 28 has a supporting bar 33 formed with cylindrical openings in opposite ends to slidably engage on cylindrical studs 25. Supporting bar 33 is latched in position on cylindrical studs 25 by balls 34 engaging in ball sockets formed in supporting bar 33 and opening into the cylindrical openings through which studs 25 project. Balls 34 are adapted to engage in annular grooves 26 and retain supporting bar 33 in accurately adjusted position on cylindrical studs 25. A leaf spring 35 has its central portion secured to a lower edge of supporting bar 33 and opposite ends engaged with the portion of balls 34 which project out of the sockets below the lower edge of supporting bar 33, as clearly shown in Fig. 3, for holding balls 34 engaged in grooves 26.

Figure 4:
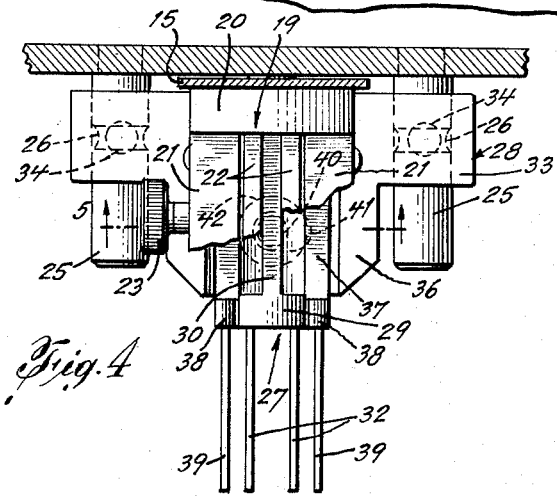
Fig. 4 is a detailed horizontal cross-section taken on line 4—4 of Fig. 3 with portions broken away to show details of construction of the attachment.

The upper central portion of supporting bar 33 is formed with a partially cylindrical section 36 having an upwardly directed partially cylindrical surface below pendulum head 27 and arms 21 arranged in concentric relation to the axis of the pendulum and drive disc. A drive block 37 has a partially cylindrical bottom face engaging the upper surface of cylindrical face of section 36. Drive block 37 has a pair of upwardly extending arms 38 on opposite sides and adjacent to disc portion 29 in transversely aligned relation therewith as shown in Fig. 4. The front face of section 36 terminates in the same transverse plane to the axis of rotation as the front face of disc portion 29. Between the upper ends of arms 38 drive block 37 has a partially cylindrical shape which is spaced and in concentric relation to the periphery of disc portion 29. Arms 38 carry a pair of specimen engaging elements 39 having one end of each element secured to one of the arms while the major portion of the elements projects forwardly from drive block 37 in spaced parallel relation to each other and to the axis of said pendulum. Specimen engaging elements 39 are in spaced parallel relation to specimen engaging elements 32 and at a distance spaced outwardly therefrom substantially equal to the distance between elements 32 and the axis of the pendulum. Elements 32 and 39 are in the form of cylindrical rods or pins and are of a length to receive and engage a test specimen throughout the width thereof while the longitudinal dimension of the test specimen extends across the instrument substantially through the axis of rotation for the pendulum and drive disc.

Figure 3:
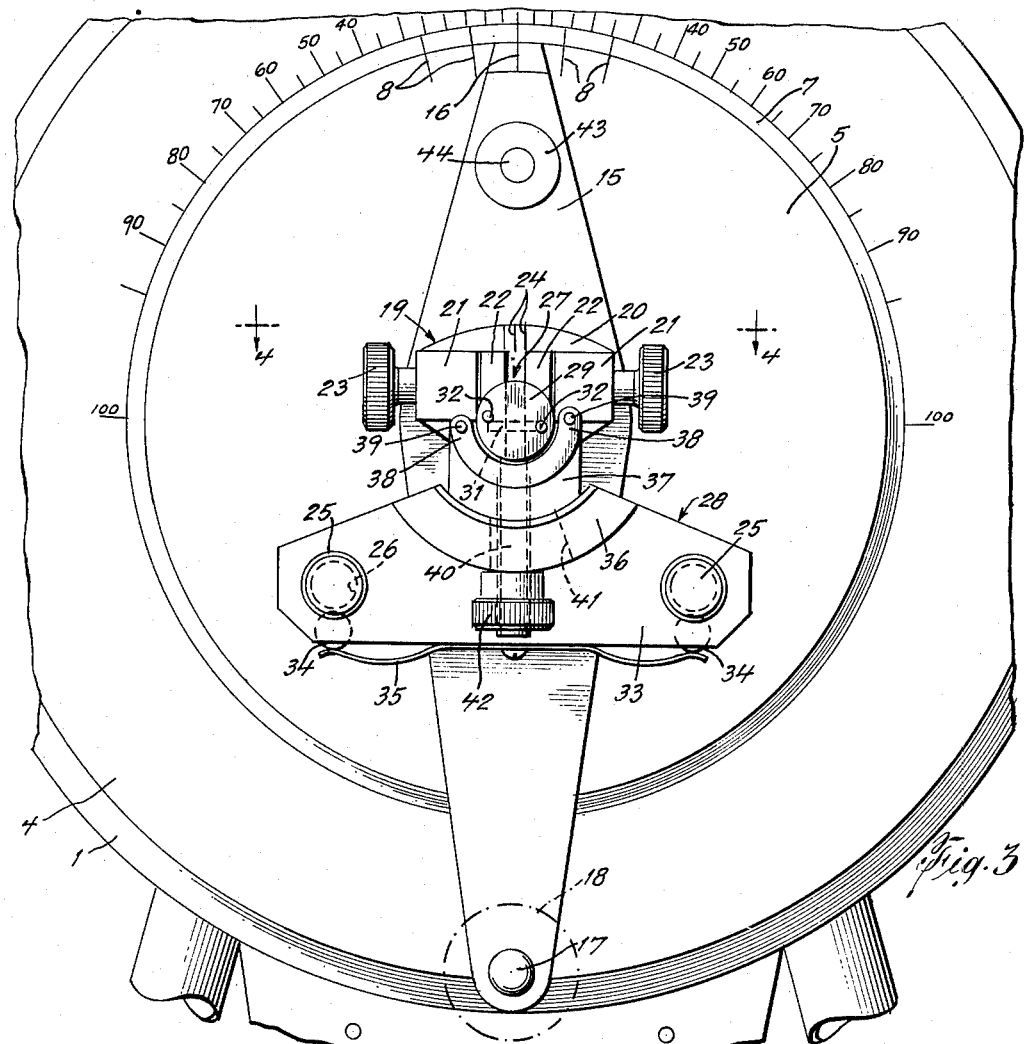
Fig. 3 is an enlarged front elevation with portions broken away showing the drive disc and pendulum with the attachments applied thereto in the central neutral position.

Drive block 37 is adjustably mounted on supporting bar 33 for movement in concentric relation to the axis of rotation from the pendulum. For this purpose, drive block 33 has a threaded stud 40 secured thereto at one end and the other end projecting downwardly through slot 41 formed in a portion of section 36 which extends in front of the lower portion of supporting bar 33, as clearly shown in Figs. 2 and 3. A thumb nut 42 is threaded on the lower end of stud 40. By loosening thumb nut 42, drive block 37 may be moved in a counter-clockwise direction as shown in Figs. 1 and 3, for moving specimen engaging elements 39 out of substantial alignment with specimen engaging elements 32. This enables a specimen of a given thickness to be inserted so that it will extend under specimen engaging element 32 at the left-hand side of Fig. 3 and over element 32 at the right-hand side. The test specimen will then extend under specimen engaging element 39 at the right-hand side of Fig. 3 and over element 32 at the left-hand side.

When the specimen is placed in this position relative to elements 39 and 32, drive block 37 is moved in a clockwise direction, as shown in Fig. 3, until the surface of elements 39 engage the top and bottom faces of the test specimen and hold the top and bottom faces in engagement with the surface of elements 32 without deflecting the pendulum. Thumb nut 42 is then manually operated to engage the bottom of section 36 and fasten drive block 37 in the adjusted position. This provides an adjustment that compensates or sets the specimen engaging elements 39 relative to the elements 32 according to the thickness of the test specimen. When the parts are in this position with the test specimen engaged between specimen engaging elements 32 and drive elements with the central portions of the specimen substantially in alignment with the axis of rotation of the pendulum, the parts are ready to start a test operation on the specimen.

Figure 5:
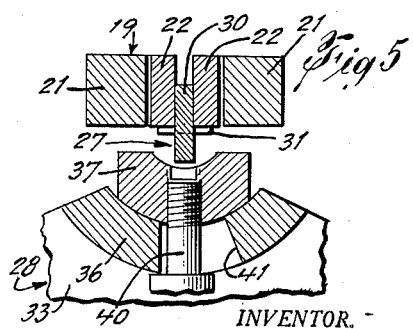
Fig. 5 is a vertical detailed cross-section taken on line 5—5 of Fig. 4.

A compensator weight 43 is mounted on stud 44 near the top of pendulum 15 as shown in Figs. 1 and 3. Drive disc 5 is then rotated in a clockwise direction as shown in Fig. 5 until the indicator mark on the pendulum registers with one of the radial marks 8 on disc 5. Indicator mark 16 on the pendulum is shown as registering with the fifteen degree radial mark at the left-hand side of the group of marks. This shows the specimen has been flexed to the desired amount so that the reading on the scale on the support is then made to determine the flexible properties of the specimen.

The attachment provides a means of testing rather sensitive and very flexible materials. The weight 43 has a predetermined relation to the scale on the instrument so that the reading will be divided by 100 in order to determine the correct result for the specimen being tested.

The specimen may be turned over and a retest made by following the same procedure described above in order to get the same effect of a left and right reading. The average of the two readings is then divided by 100 to obtain a composite result for indicating the stiffness or elastic properties of the test specimen. Should it be desired to determine whether the material has greater stiffness in a transverse direction, the specimen may be turned at right angles to the position in which the original test was made and a new test made in the new position to determine the difference in stiffness or elastic properties in both directions.

Figure 7:
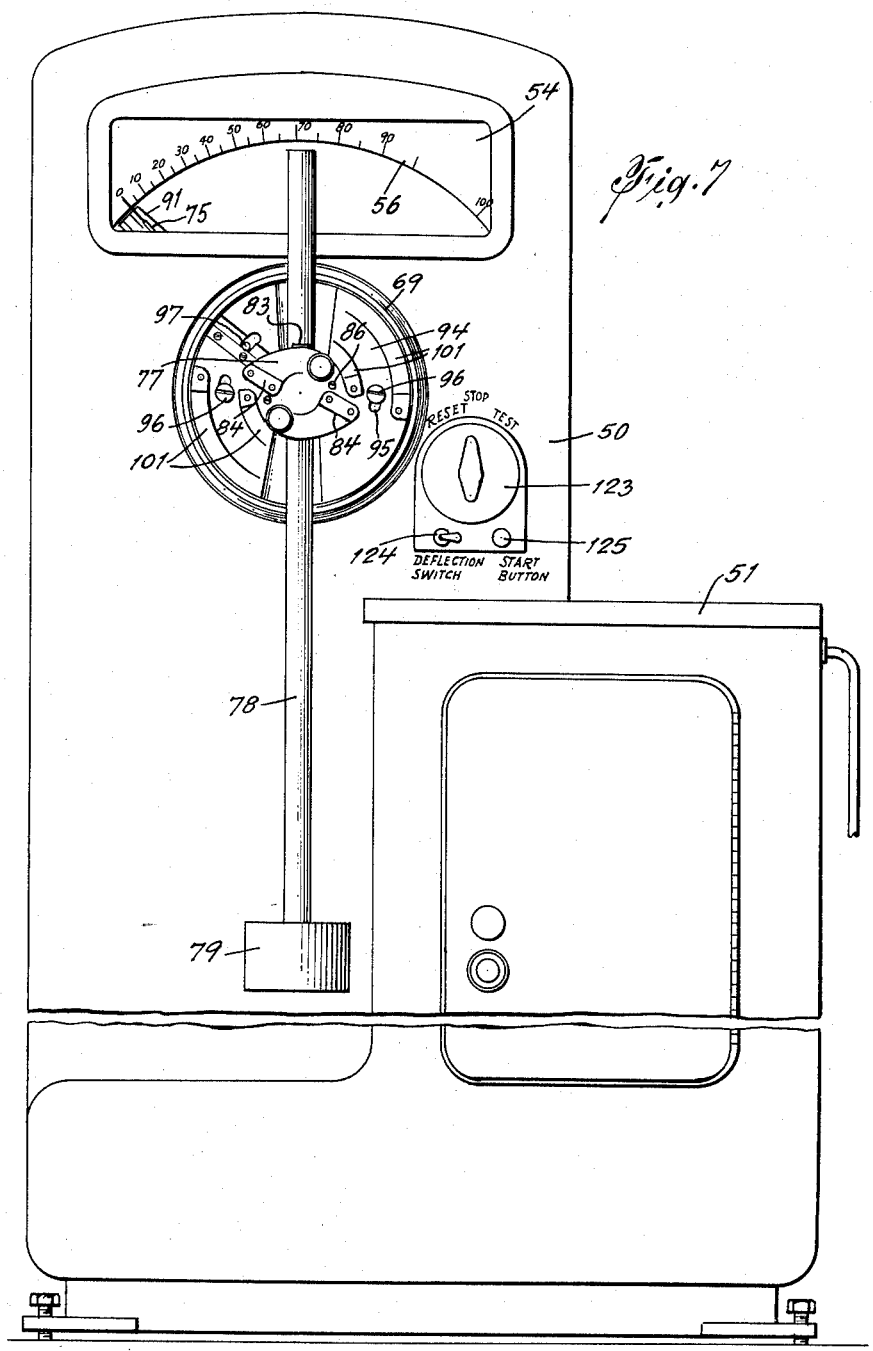
Fig. 7 is a front elevation of a testing machine constructed to utilize an S-type deflection with an adjustable drive member and an adjustable pendulum, portions being broken away for convenience in illustration.

Figs. 7–18 show an improved form of instrument from that disclosed in the aforementioned patents and the attachment disclosed above, which utilizes the feature of the S-type deflection in testing a specimen. Means is included in the form of an adjustable pendulum arranged to set the length of the pendulum arm proportionately to a multiple of the thickness of the specimen, which cooperates with the setting of the relatively movable members according to the thickness of the specimen, for directly registering the modulus of elasticity. As shown in Fig. 7, the instrument is mounted in a casing 50 adapted to be supported on the floor of a building and has feet on the bottom at the corner portions with leveling screws adjustable to position the casing in a level position to insure accurate operation of the testing mechanism. A shelf 51 is arranged on top of a projecting portion of the casing at a height convenient for supporting test sheets and specimens so that an operator can stand in front of the machine and use the shelf as a working surface during the testing of one or more specimens and enter the results on suitable testing sheets. Upper and lower main supporting frames 52 and 53 carry substantially the entire testing mechanism. They are secured to the inside of the casing so that the scale on the testing mechanism will show through a window 54 in the top front portion of casing 50, while the specimen engaging members will project through an aperture in the casing below the window, as clearly shown in Fig. 7.

Figure 8:
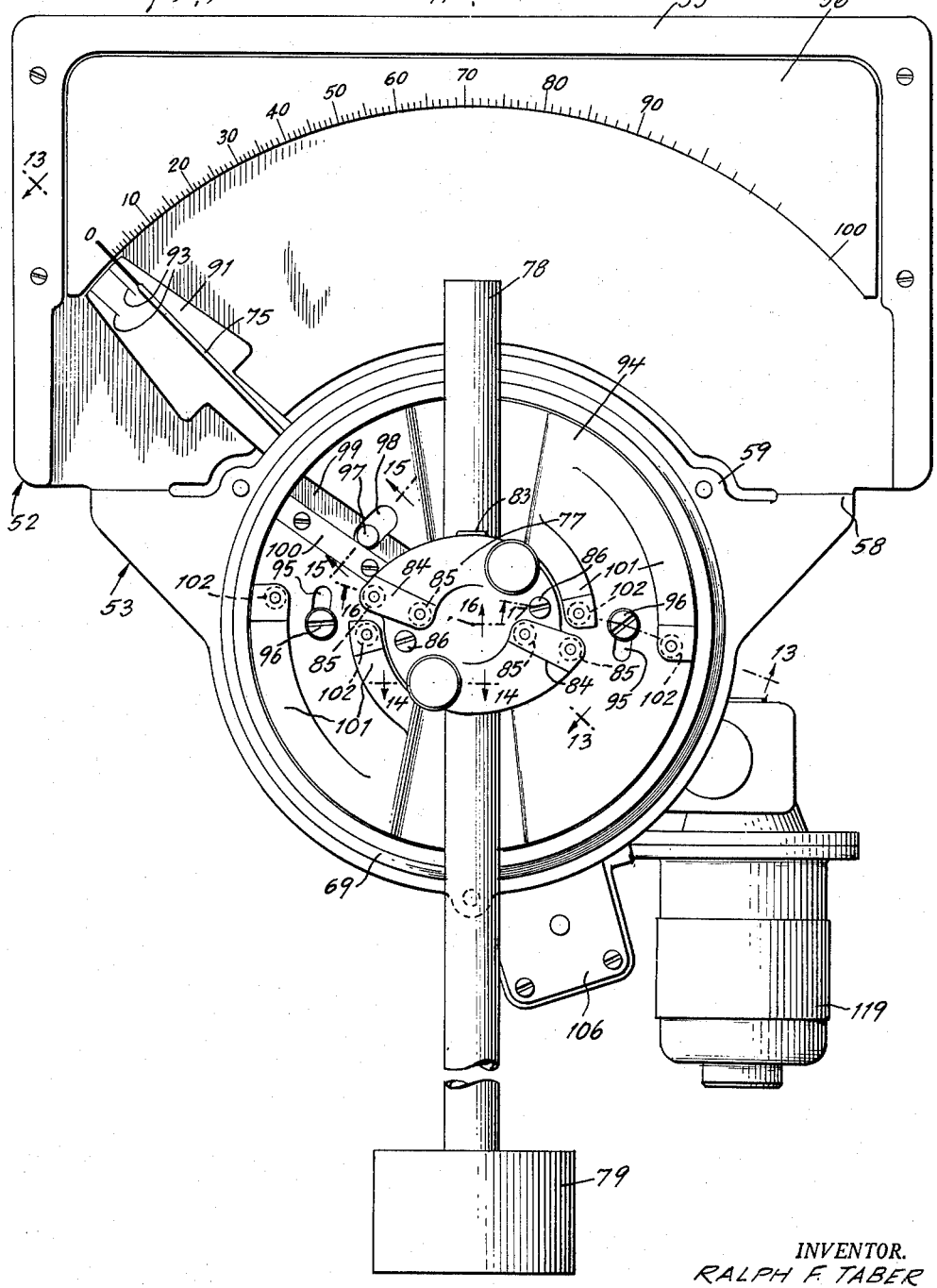
Fig. 8 is an enlarged front elevation of the testing mechanism, the casing being eliminated for the purpose of illustrating details of construction, the parts being shown in the starting, or zero position.

Upper main supporting frame 52 is of substantially rectangular shape and has a marginal flange portion 55 extending across the top and the two sides to engage the rear face of the front wall of casing 50. The frame 52 is secured to the casing by flange portion 55. Upper supporting frame 52 has a plate portion extending throughout the portion bounded by marginal flange 55 offset rearwardly so that it is spaced to the rear of the inside wall of the casing to provide space in the rear of window 54 for accommodating scale plate 56, as shown in Figs. 8 and 11. Upper supporting frame 52 has a partially circular recess forming the lower edge thereof in the central portion. Frame 52 is formed at opposite sides of this central portion with rearwardly extending attaching lugs 57 having the ends of supporting arms 58 extending from opposite upper portions of lower supporting frame 53 secured thereto, to attach the upper and lower supporting frames together in assembled relation.

Lower supporting frame 53 is in the form of a housing having ears 59 projecting upwardly from arms 58 and one projecting downwardly at the lower portion for attaching the lower supporting frame or housing to the inner face of the front wall of casing 50, as shown in Figs. 10 and 11. This attachment of the upper and lower frames 52 and 53 to casing 50 mounts the entire testing mechanism in operative position in the casing.

Lower main supporting frame or housing 53 has a gear box 60 formed on the rear end thereof with the rear opening therein closed by cover plate 61. The front wall of gear box 60 is formed with a cylindrical bearing support 62 and cover plate 61 is formed to provide an axially aligned bearing support in the central portion thereof. Bearings 63 are mounted in bearing support 62 and the bearing support formed in cover plate 61, as clearly shown in Fig. 11, for rotatably supporting tubular shaft 64 extending rearwardly from drive member 65. The front and rear portions of tubular shaft 64 are formed to receive bearings 66 rotatably mounting pendulum shaft 67 for free rotation relative to tubular shaft 64.

Lower supporting frame or housing 53 has a partially cylindrical flange portion 68 extending forwardly from the lower and side portions of gear box 60, as shown in Figs. 10 and 11, for connecting the gear box to arms 58 and ears 59. The front end of housing 53 has a circular ring 69 extending through an aperture in the front wall of casing 50 below window 54. Ring 69 at the upper portion of lower frame or housing 53 between upper ears 59 is not connected with the gear box, thereby omitting a quadrant portion of flange 68 so as to leave an opening at the top portion of the lower supporting frame. This opening provides a space in which the deflection pointer and indicator can project through the housing. A control arm can also project through this opening in operating control switches to limit power-driven movement of the relatively movable members in a manner that will be described hereinafter.

A pendulum hub 70 is mounted on the front end of pendulum shaft 67. Pendulum hub 70 has a rear flange 71 and a front flange 72 in spaced parallel relation to provide an annular groove in the hub adjustably receiving pendulum balance weight 73. Drive member 65 has an offset central portion, shown in Fig. 11, extending rearwardly to form a recess rotatably receiving pendulum hub 70. Rear flange 71 of pendulum hub 70 has a partially circular slot formed therein receiving set screw 74, shown in Figs. 12 and 16, for securing pendulum balance weight 73 in adjusted position to balance the weight of the deflection pointer and contact arm. A deflection pointer 75 extends radially from pendulum hub 70 with the inner end secured in rear flange 71, as shown in Fig. 13. The offset portion of drive member 65 is formed with a slot, shown in Fig. 13, so deflection pointer 75 can project through the drive member and freely rotate with the pendulum assembly for having the free end located adjacent the partially circular edge of scale plate 56 indicating the deflection of the pendulum member on the sine scale applied to the marginal portion of this partially circular edge of plate 56. Front flange 72 of pendulum hub 70 is formed with an annular shoulder 76 for rotatably receiving an annular flange on the rear end of pendulum head 77. Pendulum head 77 projects forwardly in coaxial relation with hub 70 and pendulum shaft 67.

Pendulum head 77 has a transversely extending cylindrical bore slidably receiving pendulum shaft 78 having a pendulum weight 79 secured to the lower end thereof. Pendulum shaft 78 is adjustably retained in position in pendulum head 77 by means of two transversely extending lock bars 80, as shown in Figs. 11 and 14. Fig. 14 shows the details of construction of the lock bar at the lower portion of the pendulum head and it will be understood that the lock bar at the upper portion is constructed in the same way as the lower one, except that the parts are reversed in position. Lock bar 80 has a fulcrum pin 81 at one end, while the opposite end has a threaded aperture therein for receiving the threaded end of manually operated tightening screw 82. Fulcrum pin 81 and screw 82 engage lock bar 80 at opposite sides of pendulum shaft 78, as shown in Fig. 14, so that tightening of screw 82 will move lock bar 80 forwardly from fulcrum pin 81 so that the central arcuate face of bar 80, as shown in Fig. 14, will tightly engage and clamp pendulum shaft 78 against movement in head 77. The two screws for operating the two bars are clearly shown in Figs. 1, 8 and 9, from which it should be clearly understood that both of the screws are loosened to adjust the pendulum shaft and then tightened to hold it in its adjusted position.

The upper periphery of pendulum head 77 has an indicator projection 83 used in connection with the scale on the pendulum shaft for adjusting the position of the pendulum weight to the desired setting for a given thickness of a test specimen. Pendulum head 77 has a pair of arms 84 extending forwardly therefrom forming spaced flanges to detachably mount a pair of specimen engaging elements 85 in parallel relation to each other in the axis of rotation of the pendulum shaft. This pair of specimen engaging elements 85 extend between the flanges on arms 84 and the front face of pendulum head 77 so that opposite ends of the elements are firmly mounted and supported by the pendulum head. Arms 84 and the pendulum head are provided to mount the pair of specimen engaging elements in two positions, one at the inner ends of the arms and the other at the outer ends in radially spaced relation to the inner position thereof. This pair of elements are alternately used in either the inner or outer positions according to the size and thickness of the specimen to be tested in order that the instrument can be adapted to testing specimens having a substantially wide range of thicknesses. Pendulum head 77 is detachably mounted on pendulum hub 70 by a pair of belts 86, as shown in Figs. 8 and 17.

Figure 9:
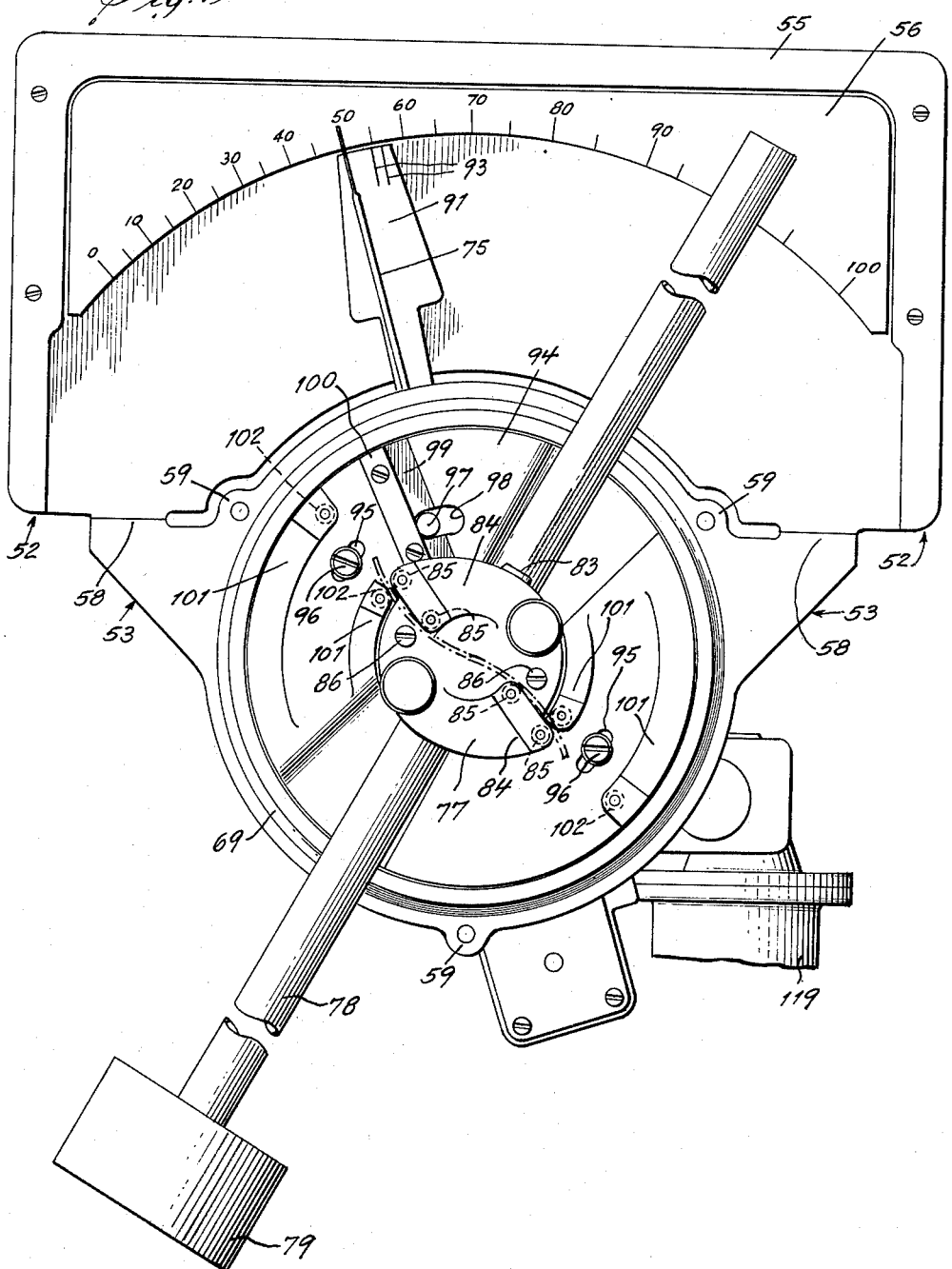
Fig. 9 is a view similar to Fig. 8, showing a specimen in the test position and the parts rotated to flex the specimen a given amount in determining the modulus of elasticity.

Drive member 65 has a bracket 90 mounted on the rear upper marginal portion thereof, as shown in Figs. 10 and 13, in radially extending relation, for supporting radially extending deflection indicator 91 and a rearwardly extending switch operating arm 92. The end of deflection indicator 91 projects into adjacent relation to the partially circular edge of scale plate 56, as shown in Figs. 8 and 9, for example. Deflection indicator 91 is located adjacent and to the rear of deflection pointer 75. At the outer end, deflection indicator 91 has a plurality of indicating marks 93 provided thereon in radially extending relation to indicate the reflective deflection between the pendulum member and the drive member. The mark at the right-hand portion of deflection indicator 91, as shown in Fig. 9, indicates the position for deflection pointer 75 when the relatively movable members have no relative deflection and are in the zero position, as shown in Fig. 8. The first mark 93 to the left of this right-hand mark, as shown in Fig. 8, indicates when the members have been deflected relative to each other an amount sufficient to flex a specimen 1 millimeter. The left-hand mark on deflection pointer 91 indicates the deflection of a specimen 2 millimeters. The two left-hand marks are used to indicate the deflection used for the different specimen testing ranges covered by the instrument.

The front outer marginal portion of drive member 65 is formed with a shouldered portion for receiving the recessed rear edge of the annular flange on drive head 94. Drive head 94 is in the form of an annular member extending about pendulum head 77, as clearly shown in Figs. 8, 9, and 11. Drive head 94 is formed at diametrically opposite portions with circumferential slots 95 which receive attaching bolts 96 for rigidly attaching drive head 94 to drive member 65 in adjusted position. Drive member 65 has a positioning pin 97 projecting forwardly through slot 98 in drive head 94. Drive head 94 has a radially extending recess 99 formed in the front face thereof, as shown in Figs. 8, 9, and 15, communicating with the left-hand end of slot 89 so that a test specimen can be inserted in radial relation in recess 99 to engage the surface of pin 97 on one side. The left-hand side of recess 99 has a gauge bar 100 rigidly secured therein so a specimen may be engaged between gauge bar 100 and positioning pin 97 for setting the position of drive head 94 relative to drive member 65 according to the thickness of the specimen. This adjusts the position of drive head 94 relative to the position of deflection indicator 91 so the drive and pendulum members may be adjusted to receive a test specimen without moving deflection pointer 75 out of the zero position. In this way, the adjustment of drive head 94 on drive member 65 compensates for the thickness of the specimen which has been found necessary in a machine for directly registering the modulus of elasticity of a test specimen. Attaching bolts 96 are loosened so that drive head 94 can be moved in a counterclockwise direction, as shown in Fig. 9, for inserting a test specimen in recess 99 in setting the head relative to the drive member. When the test specimen is firmly engaged by positioning pin 97 and gauge bar 100, bolts 96 are tightened to retain drive head 94 in the adjusted position.

Drive head 94 is recessed in diametrical relation to accommodate pendulum shaft 78, so it will not be in contact therewith. This will be apparent from Figs. 8, 9, and 11. Drive head 94 has two pairs of forwardly projecting arms 101 at substantially diametrically opposite portions with the ends arranged to receive and support inner and outer pairs of specimen engaging elements 102. The inner pair of elements 102 are positioned for cooperation with the outer ends of a test specimen, engaging specimen engaging elements 85 when positioned at the inner ends of arms 84. The outer pairs of specimen engaging elements 102 cooperate with a longer and different size of test specimen at the outer ends thereof while intermediate portions engage specimen engaging elements 85 on the pendulum head when positioned at the outer ends of arms 84.

The rear end of tubular shaft 64 carries a radially extending deflector control arm 105 mounting deflection motor 106 on the free end. A pair of spaced parallel projections 107 are formed on arm 105 and have axially aligned set screws 108 for controlling the position of deflection control arm 109 at the free end. The other end of control arm 105 is secured to tubular shaft 64, as shown in Fig. 11. The free end of control arm 109 has a contact supporting plate 110 of suitable insulating material secured thereto with a portion projecting rearwardly therefrom and supporting a pair of contact points 111 connected in the deflection control circuit. Set screws 108 are adjusted so that control arm 109 can be moved either clockwise to engage left-hand set screw 108 as shown in Fig. 10, or counterclockwise to engage the right-hand set screw 108. Control arm 109 has a pin 112 projecting forwardly therefrom into the bifurcated end of operating lever 113 having the opposite end secured to the rotatable shaft of deflection motor 106. Deflection motor 106 operates operating lever 113 in a counterclockwise direction as shown in Fig. 10 to move control arm 109 against the left-hand set screw 108 when the testing instrument is set for testing a specimen through a deflection of 2 millimeters. When a deflection of 1 millimeter is used in testing a specimen, deflection motor 106 is operated to move operating lever 113 in a clockwise direction to move control arm 109 to the right, as shown in Fig. 10, to engage right-hand set screw 108.

The rear end of pendulum shaft 67 carries a deflector contact arm 114 secured thereto at one end having the other end extending radially from the pendulum shaft in adjacent substantially parallel relation to control arm 109, as shown in Figs. 10 and 11. The free end of deflector contact arm 114 carries deflector contacts 115 on a rotatable contact block 116 arranged to allow free movement of contacts 115 so that they can engage and close the circuit between contacts 111 whenever the pendulum member has moved relative to the drive member to the deflected position indicated by one of the indicating marks 93 on deflection indicator 91. Contacts 115 are aligned with contacts 111 for engagement therewith whenever deflection contact arm 114 is moved relative to control arm 109 with 1 millimeter or 2 millimeters according to the position for which control arm 109 is adjusted by the deflection motor. This contact mechanism at the rear end of the pendulum and tubular shafts operates the control circuit in a manner to be hereinafter described for automatically stopping the operation of the testing instrument when a specimen has been flexed a given amount.

Tubular shaft 64 has a worm gear 117 rigidly mounted thereon in gear box 60 and driven by a worm 118 mounted on the shaft of main drive motor 119 having a gear reduction unit mounted between the motor armature shaft and worm 118 to rotate worm 118 at the desired speed for slowly moving the drive member in testing a specimen. Main drive motor 119 has the reduction drive built in and mounted on one side of the gear box 60, as clearly shown in Fig. 10. Main drive motor 119 is a two-speed reversible motor for rotating tubular shaft 64 in both directions so as to test a specimen in rotation in one direction at low speed and return the shaft to its starting position at a high speed when the testing operation has been completed.

A pair of limit switches 120 and 121, respectively, are adjustably mounted on the rear face of upper supporting frame 52 in position to have the end of the movable switch arm projecting into the path of movement of switch operating arm 92. Switches 120 and 121 are operated to open a control circuit to limit movement of drive member 65 to an arc of approximately ninety degrees in both directions. In this way, the power operation of the testing instrument by main drive motor 119 can be controlled so the parts are not damaged by movement past the limit for which the construction is designed due to specimen breakage or other abnormal operation.

Power operation of the instrument shown in Figs. 7–18 is provided so a test operation can be obtained automatically, as well as resetting of the testing members to the starting position. For this purpose, a plurality of relays are used in the control of deflection motor 106 and main drive motor 119 in a manner that will be more clearly understood by reference to the wiring diagram in Fig. 18. The relays and other components of the electrical system are mounted on an instrument panel 122 on the back of upper main frame 52, as shown in Fig. 11. A main control switch 123 is mounted in the front wall of casing 50 at the right-hand side thereof as shown in Fig. 7 in a convenient position for manual setting of the switch to three different positions in the operation of the instrument. The central position is the "stop" position, the left-hand position as shown in Fig. 7 as the "reset" position, and the right-hand position is the "test" position. Adjacent to switch 123 having the three positions above described, are two other switches, one a deflector switch 124 and the other a push button starting switch 125.

Reference to the wiring diagram in Fig. 18 will show the circuit connections for the operation of the machine in testing specimens. Main control switch 23 has three sets of contacts and three pairs of switch blades, indicated in Fig. 18 as A, B, and C. The switch blades are rotated to close the circuit between two pairs of contacts in each of the three positions referred to above. Fig. 18 shows the switch blades in the "stop" position. In this position the drive and pendulum members are in the starting position with the deflection indicator and pointer at the zero position on the scale carried by scale plate 56. In this position both motors and the control circuits are de-energized. When a test specimen is placed in the instrument the switch will be rotated clockwise, as shown in Fig. 7, into the "test" position. Referring to Fig. 18, this operation of the switch will move the switch blades in a counterclockwise direction so that the leading edge of each switch blade will be moved to engage the next adjacent contact in a counterclockwise direction. Limit switch 120 is open, 121 closed, deflection points 111, 115 open, and deflection switch 124 in either 1 millimeter or 2 millimeter position.

The instrument is then ready to start the testing operation on the specimen. Push button starting switch 125 is momentarily closed. This will close the circuit from one side of the power supply through wire 126 having a connection with main control relay 127. Wire 126 is connected to relay magnet 128 and to the movable contact arm 129 of the relay. Current flows through magnet 128 to wire 130 to contact 131 of stop control relay 132. The movable arm 133 of stop control relay 132 engages contact 131 in the de-energized position thereof for current flow through wire 134 to main control switch 123 contact set A where the switch blade closes the circuit from wire 134 to wire 135. Wire 135 is connected to limit switch 121 which is in the closed position closing the circuit to wire 136 connected to contact set A of switch 123 where the circuit is closed to power supply wire 137 by the switch blade of set A. The closing of this switch in energizing of magnet 128 of main control relay 127 causes the four movable contact arms to move from the de-energized position to the right as indicated in Fig. 18, into the energized position. This causes movable contact arm 129 to engage contact 138 connected to power supply wire 126 and thus maintain relay magnet 128 continuously energized.

Deflection switch 124 having been set to either the 1 millimeter or 2 millimeter position will close the circuit from the main supply wire 126 through wire 138 to the winding 139 of motor 106 and then to main power supply wire 137 for 1 millimeter deflection. If deflection switch 124 is set in the 2 millimeter position, main supply wire 126 will be connected through wire 140 to motor winding 141 and then to main supply wire 137. Deflection motor 106 is a conventional alternating current reversible motor in which winding 139 secures rotation in one direction and winding 141 rotation in the other direction. This will operate control arm 109, in the manner hereinabove described, so that it will be set in engagement with one of the set screws 108. A condenser 142 is connected across wires 138 and 140 to provide a high starting torque for the motor.

Main drive motor 119 is operated by circuit from wire 126 to contact 143 of main control relay 127, to movable contact arm 144, wire 145, a contact set B of main control switch 123 through the upper switch blade to wire 146 connected to one terminal of motor 119. The circuit in the motor is through windings 147 and 148 to wire 149, contact set C of main control switch 123 through the upper switch blade of set C to wire 150 connected to movable contact arm 151 of relay 127 engaged in the energized position with contact 152 connected to main power supply wire 137. A conventional two-speed reversible motor is used as the main drive motor 119. Windings 147 and 148 secure slow speed operation of the motor so as to rotate drive head 94 in a clockwise direction, as shown in Fig. 7, to flex a specimen in the testing operation. A circuit is also closed by main control relay 127 from wire 126 through movable contact arm 153 in the energized position to contact 154, wire 155 to magnet 156 of delay relay 157. The other terminal of magnet 156 is connected to main supply wire 137. This energizes magnet 156 to move the movable contact arm 158 into the energized position to close the circuit from main power supply wire 126 to contact 159, wire 160 connected to selenium rectifier 161 and then to main supply wire 137. This energizes the selenium rectifier.

When the specimen is deflected 1 millimeter or 2 millimeters according to the setting of deflection switch 124, deflector contacts 115 will engage contacts 111. This will close a circuit from wire 126 through movable contact arm 153 of main control relay 127 to contact 154, wire 155, magnet 162 of stop control relay 132, wire 163 to one contact 111, then through deflector contacts 115 to the other contact 111 to wire 136 and then to main supply wire 137 through contact set A and the upper switch blade thereof. When relay magnet 162 of stop control relay is energized, it operates movable contact arm 133 to open the circuit to contact 131 and opens the circuit through relay magnet 128 de-energizing main control relay 127. The four movable contact arms 129, 153, 151, and 144, of main control relay 127 then move from the energized position engaging the contacts at the right, as shown in Fig. 18, to disengage these contacts and engage the contacts to the left. Then, current flows from rectifier 161 through wire 165 to contact 166 of main control relay 127 engaged by movable contact arm 144, then through wire 145, through contact set B of main control switch 127 and the upper switch blade thereof to wire 146 through windings 147 and 148 of main drive motor 119 to wire 149 through contact set C of main control switch 123, including the upper switch blade thereof to wire 150, movable contact arm 151 of main control relay 127 to contact 167 and wire 168 connected to the minus side of selenium rectifier 161. Direct current thus flows through windings 147 and 148 of main drive motor 119 and stops the motor instantly. The motor is stopped as soon as deflection contacts 115 engage contacts 111 providing the desired deflection of the test specimen to either 1 millimeter or 2 millimeters according to the position of deflector switch 124.

When main control relay 127 is de-energized movable arm 153 disengages contact 154 and opens the circuits through wire 155 to magnet 156 of de-energizing delay relay 157. This causes movable contact arm 158 of delay relay 157 to disengage contact 159 and open the circuit through wire 160 to selenium rectifier 161. The operation of delay relay 157 is arranged so that it will hold the circuit through movable contact arm 158 and contact 159 closed for ⅕ of a second after relay magnet 156 is de-energized. When movable contact arm 158 disengages from contact 159 opening the circuit, all of the circuits are opened. The test operation is therefore completed.

Main control switch 123 may then be manually operated to the "reset" position. The main control switch may also be moved to the "reset" position in any position of the deflection pointer and indicator on the scale. Limit switch 120 is closed and limit switch 121 may be opened or closed. Deflection points 111, 115 may be open or closed. Deflection switch 124 may be in either the 1 millimeter or 2 millimeter position. Then, push button starting switch 125 is momentarily closed. This completes the circuit through wire 126 to deflection switch 124 through either wire 138 or 140 and then through one of the windings of deflection motor 106 to main supply wire 137 for causing deflection motor 106 to set the deflection control arm 109 either in the 1 millimeter or 2 millimeter position. When the circuit is closed from wire 126 through relay magnet 128 of main control relay 127, wire 130, contact 131 and movable contact arm 133 of stop control relay 132, wire 134 to contact set A of main control switch 123 through the lower switch blade thereof to wire 169 connected with limit switch 120 in closed position and from the other terminal thereof to main power supply wire 137. This energizes main control relay magnet 128 moving the four movable contact arms to the right, as shown in Fig. 18. Again, main control relay 127 has relay magnet 128 locked in energized position by movable contact arm 129 engaging contact 138 for holding the circuit closed, as hereinabove described. A circuit is then closed from wire 126 to contact 143 of main control relay 127 through movable contact arm 144, wire 145 contact set B of main control switch 123 through the upper switch blade thereof to wire 146 to main drive motor 119 including winding 147, winding 170, wire 171 to contact set B of main control switch 123 through the lower switch blade thereof, wire 150, movable contact 151 of main control relay 127, contact 152 to main supply wire 137. At the same time the circuit through wire 145 is also closed through contact set C of main control switch 123, including the upper switch blade thereof to wire 149, to winding 148 of motor 119 to winding 170 and wire 171 to main supply wire 137 as above described. This dual circuit secures high speed operation of main drive motor 119 in a reversed direction to return the drive member to the zero position so that the deflection pointer and indicator will both register with the zero point on the scale.

A circuit is closed through wire 126, movable contact arm 153 of main control relay 127 to contact 154, wire 155, delay relay magnet 156 to main supply wire 137. Delay relay 157 is thereby energized operating movable contact arm 158 to engage contact 159 to close the circuit to wire 160, to the selenium rectifier and to main supply wire 137.

When the machine reaches the zero position, limit switch 120 is opened. This opens the circuit to relay magnet 128 of main control relay 127 allowing all four movable contact arms to move to the left, as shown in Fig. 18. Movable contact arm 153 of main control relay 127 disengages contact 154, de-energizing magnet 156 of delay relay 157. Movable contact arm 158 will remain engaged with contact 159 for ⅕ of a second providing for flow of direct current through motor windings 147, 148, and 170 to stop the motor instantly. After ⅕ second, movable contact arm 158 will disengage contact arm 159 and result in a complete opening of all of the circuits so that they all become de-energized.

Main control switch 123 may be turned to the "stop" position while running on a test cycle. The circuits will operate in the following described manner to stop the machine. Limit switches 120 and 121 will be closed. Turning main control switch 123 from "test" to "stop" position opens the circuit through the lower switch blade of contact set A of switch 123 through wire 135 to limit switch 121. This de-energizes magnet 128 of main control relay 127 and with the ⅕ second operation of delay relay 157 all of the circuits of the machine are opened and it is immediately stopped at the position in which the machine parts are located at the time the circuits described above complete their operation.

Turning main control switch 123 from "reset" to "stop" position also immediately stops the machine in the same manner as if limit switch 120 were opened. This results from opening the circuit through wires 134 and 169 by movement of the lower switch blade to open the circuit between these wires at contact set A of main control switch 123.

With a test instrument constructed, as shown and described above in connection with Figs. 7–18 inclusive, the instrument is adapted for testing specimens throughout two ranges of operation of the instrument. For the two ranges of testing operations, two different pendulum weights are used. The pendulum shafts for each of the two weights are identical, pendulum shaft 78 preferably being of tubular construction while pendulum weight 79 for one testing range of the instrument will use a 1000 gram weight and for the other range the weight will be 5000 grams.

The center of gravity of each pendulum shaft and weight is determined and then a scale is applied to pendulum shaft 78, different scales being used on the 1000 gram weight from that of the 5000 gram weight. A distance is measured on the pendulum shaft from the center of gravity in a direction toward the end opposite to the end carrying the weight equal to the radius of pendulum head 70 from the axis of rotation of the pendulum head 70 to the surface of indicator projection 83 thereon. This provides the zero position for the pendulum scale on each of the two pendulum shafts. The scale on each pendulum shaft is proportioned to the cube power of the thickness of a test specimen because the moment of inertia of the rectangular cross-section of a specimen changes as the cube power of the thickness. Therefore, the scale on each pendulum shaft is determined in proportion to the cube power of the thickness of the specimen. First, it is found necessary to choose a dimension from the zero point on the scale to the starting position for a test specimen of given thickness. This dimension is chosen arbitrarily. For example, on the scale in Fig. 19 a dimension of 50 millimeters is arbitrarily chosen for the distance at which the figure ".010" is applied to the pendulum shaft for a specimen having a thickness in inches equal to .010.

The position of each of the other dimensions on the scale is then located in accordance with this arbitrarily chosen dimension. For example, the mark for a thickness in inches of .020 on the shaft will be located in accordance with the formula $A:B = .010^3 : .020^3$. The dimension A is that indicated in Fig. 19 as the arbitrarily chosen dimension, while B as indicated in Fig. 19 is the distance that the division on the scale for the dimension ".020" will be located from the zero point. By solving the equation given about $B = 8 \times A$, $A = .9685$ and therefore B=15.7480. By using this same formula the position of all the other marks on the scale is determined for the scales on both pendulums.

Two scales are used on the 1000 gram pendulum as shown in Fig. 19, the first scale, "Scale I," providing for the testing of specimens from .010" to .023" while the other scale, "Scale II," is for testing specimens from .014" to .040".

Fig. 20 shows the three scales used on the 5000 gram pendulum. Scale I is for testing specimens having a thickness from .022" to .040". Dimension A of the formula above described used in connection with the scale on the pendulum shaft for the 5000 gram pendulum shown in Fig. 20 is 4.1921 inches. Scale II is for testing specimens having a thickness .040" to .081" while Scale III is for testing specimens having a thickness running from .080" to .163".

In using this instrument described and shown in Figs. 7-18, a specimen of fixed size is used for each range of the instrument. With the use of the 1000 gram pendulum the specimen will have a length of 4.25 inches and a width of 1 inch. The thickness of the specimen is determined and the pendulum is set so that the figure on the pendulum shaft registering the specimen thickness is positioned in registry with the surface of indicator projection 83. When the pendulum shaft is secured in this adjusted position for the specimen thickness, attaching bolts 96 are loosened, drive head 94 is rotated counterclockwise, as shown in Fig. 8 for example, so that the specimen may be inserted between positioning pin 97 and gauge bar 100. Drive head 94 is then rotated in a clockwise direction until positioning pin 97 engages one side of the specimen while the opposite side is engaged with gauge bar 100. Attaching bolts 96 are then tightened to secure the drive head in position on the drive member. Two 4.25 inch specimens are used between gauge bar 100 and pin 97, while one 8.25 inch specimen is used.

The specimen or specimens are removed from the position between pin 97 and bar 100 and one is then inserted between the specimen engaging elements on the drive head and the pendulum. The specimen will have the central portion extend through the axis of rotation of the pendulum and drive members with opposite ends engaging the inner pair of specimen engaging elements 85 on the pendulum head and the inner pair of specimen engaging elements 102 on the drive head. The specimen will thus be in a substantially horizontal position with the left-hand specimen engaging element 102 on the drive member, as shown in Fig. 8, engaging the underside of the specimen at the left-hand end and specimen engaging element 85 on the pendulum head on the right-hand side thereof engaging the underface of the specimen. The other two specimen engaging elements will engage the upper surface of the specimen.

By moving main control switch 123 to the "test" position and setting deflection switch 124 to the 2 millimeter position, the operator presses the push button starting switch 125 which will close the circuit described hereinabove to secure automatic power operation of drive head 94. Drive head 94 will be rotated in a clockwise direction, as shown in Fig. 8, while the pendulum head will have its rotation in a clockwise direction resisted by the pendulum weight. The specimen is therefore flexed on opposite sides of the center portion in opposite directions into a substantially S-shape. When the flexing of the specimen between specimen engaging elements 102 on drive head 94 and specimen engaging elements 85 on pendulum head 77 has reached the deflection of 2 millimeters, the control circuits will be operated in the manner hereinabove described to immediately stop further rotation of drive head 94 at which point deflection pointer 75 and deflection indicator mark 93 on deflection indicator 91 will register with each other and indicate on the scale provided on scale plate 56 the modulus of elasticity of the specimen.

Fig. 9 shows a specimen in the deflected position where the specimen has deflected 2 millimeters registering 50 on the scale and indicating a modulus of elasticity of 50. After the indication on the scale of scale plate 56 is recorded, the operator then operates main control switch 123 to "reset" position to secure automatic operation of the instrument to return the mechanism of the instrument to the zero position when it is then ready to start a test on a new specimen by proceeding in the manner above described.

Fig. 21 is a view of a plate which may be attached to the front face of the offset central portion of upper frame member 52 below scale plate 56. This plate, as shown in Fig. 21, contains a chart showing thickness, sizes, and lengths for metallic and non-metallic specimens to be tested in the instrument, together with the pendulum weight to be used with each specimen thickness, width, and length, and the setting for the deflection switch. The table points out that in testing non-metallic specimens the dial reading is to be divided by 8 while the dial reading on scale plate 56 is a direct reading of modulus of elasticity in flexure for metallic test specimens.

The chart also points out the length of the specimens for the different thicknesses of test specimens which the machine is adapted to test. When the 4.25 inch specimens are tested, the inner pairs of specimen engaging elements are used in both the pendulum head and the drive head. When the 8.25 inch specimens are to be tested, the specimen engaging elements are removed from the inner positions in the pendulum head and inserted in the outer positions. This allows the central portion of the specimen to flex between the front face of the pendulum head and the inner edge of arms 84. In this way, the specimens are flexed by the specimen engaging elements without binding action on the specimen at any point so that the specimen is free to flex in both directions with a neutral point in the center.

Figs. 19 and 20 diagrammatically show the arrangement of the several scales on the pendulum shafts for the two different weights. The pendulum with the 1000 gram weight has one scale marked as "Scale I" and the other scale is marked as "Scale II." The three scales on the 5000 gram weight pendulum shaft have corresponding indications with Roman numerals indicating the scales in consecutive order. These scale identifications shown in Figs. 19 and 20, are shown in the chart in Fig. 21, so that it will be clear by comparing Figs. 19 to 21 how to set the pendulum shaft for each test specimen thickness according to the type of material being tested.

From the foregoing description it will be understood that in both forms of the invention herein disclosed, the test specimen will be engaged by the two pairs of specimen engaging elements on the driving and pendulum members so that in the movement of the driving member the pendulum member will resist movement of the specimen, causing opposite ends of the specimen to flex in opposite directions into a substantial S-shape whereby a direct reading of the elastic properties of the material of the test specimen in flexure can be made. One of the members, the drive member in each case, is provided with means by which it is adjusted to compensate for the thickness of the specimen, so that it is set at the beginning of the test operation to engage the specimen surface but not cause any deflection thereof.

Figs. 7–21 show an instrument wherein a pair of relatively movable testing members are provided with pairs of specimen engaging elements arranged to engage a test specimen at opposite ends, have deflection indicating means to show when the test specimen has been flexed a given amount with means providing for the setting of one member relative to the other to compensate for the thickness of the test specimen, and an adjustable pendulum carrying a weight adjustable in one of the members with a scale provided on the pendulum proportioned according to a multiple of the thickness of the specimen.

By this setting of the pendulum shaft and weight with a length proportioned according to a multiple of the thickness of the specimen and a pair of members are adjusted according to specimen thickness, an instrument is obtained for directly indicating on a sine scale the modulus of elasticity of a test specimen in flexure.

The invention claimed is:

1. An instrument for measuring the elastic properties of materials in flexure, comprising a pair of relatively movable members, means for retarding movement of one of said members relatively to the other, each of said members having a pair of specimen engaging elements projecting in spaced parallel relation for engaging opposite end portions of a test specimen, and means for adjusting one pair of said elements relative to the other according to the thickness of the test specimen, said members being operable in relative movement to flex opposite ends of said test specimen in opposite directions for indicating the elastic properties on a scale thereon when flexed a given amount.

2. An instrument for measuring the elastic properties of materials in flexure, comprising a pair of relatively movable members, means mounting said members for relative rotative movement about a common axis, each member having a pair of test specimen engaging elements spaced substantially equidistantly on opposite sides of said axis in parallel relation, the elements on one member being spaced a greater distance apart than the others, means for retarding movement of one of said members relative to the other, means for adjusting the position of one of said members relative to another an amount equal to the thickness of a test specimen engaged between said elements with the central portion of said specimen intersecting said axis, means for rotating one of said members while the movement of the other one is retarded for flexing opposite ends of said test specimen on opposite sides of said axis into oppositely-curved substantially S-shaped relation, and means on said first mentioned means for indicating the composite elastic properties of said test specimen when flexed a given amount in opposite directions.

3. An instrument for measuring the elastic properties of materials in flexure, comprising a pair of relatively movable members, each of said members having a pair of specimen engaging elements projecting in spaced parallel relation for engaging opposite end portions of a test specimen, means for adjusting the position of one pair of said elements relative to the other according to the thickness of the test specimen, means for retarding movement of one of said members relative to the other having means operable to vary the retarding force to proportion the retarding force of said means to a multiple of the thickness of each test specimen, said members being operable in relative movement to flex opposite ends of said test specimen in opposite directions for indicating the modulus of elasticity on a scale when flexed a given amount.

4. An instrument for measuring the elastic properties of materials in flexure, comprising a pair of relatively movable members, means mounting said members for rotation about a common axis, each member having a pair of specimen engaging elements projecting in spaced parallel relation to said axis, said elements of each pair being located on opposite sides of said axis in substantially equally spaced relation therefrom, the pair of elements on member being spaced outwardly substantially equidistantly beyond the pair of elements on the other member, all of said elements being in transversely aligned relation to said axis, for receiving and engaging a test specimen arranged in transversely extending relation to said axis with opposite end portions extending substantially equidistantly on opposite sides of said axis, indicating the relative movement of said members to each other, means for adjusting at least one of said members relative to the other and said indicating means according to the thickness of a test specimen, and a pendulum weight mounted on one of said members having its position adjustable relative to said axis according to a multiple of test specimen thickness for retarding movement of said member, whereby rotation of the other member will bend said specimen between said pair of elements thereon and the pair of elements on said pendulum retarded member in opposite directions into substantial S-shape while said indicating means will register the modulus of elasticity on a scale when said specimen has been flexed a given amount.

5. An instrument for measuring the elastic properties of materials in flexure comprising a pair of relatively movable members, means mounting said members for rotation about a common axis, each member having a pair of specimen engaging elements projecting in spaced parallel relation to said axis, said elements of each pair being located equidistantly to and on opposite sides of said axis, the elements on one of said members being spaced outwardly beyond the elements on the other member, all of said elements lying in the same transverse plane to said axis for receiving a test specimen in transversely extending relation with opposite ends extending substantially equally on opposite ends extending substantially equally on opposite sides of said axis, indicating means operated by each of said members for indicating the relative movement between said members, means for adjusting at least one of said members relative to the other and said indicating means according to the thickness of a test specimen to position said pairs of elements to engage opposite sides of each specimen in unstressed relation while said indicating means remains in zero position, and means for retarding movement of one of said members whereby rotation of the other of said members will bend said specimen about said elements in opposite directions on opposite sides of said axis in cooperation with the retarded movement of said one member for indicating the elastic properties of said specimen on a scale cooperating with said indicating means when said specimen is bent a given amount.

6. An instrument for measuring the elastic properties of materials in flexure, comprising a support, a driving member mounted on a tubular shaft extending in perpendicular relation from the center of one side thereof, means rotatably mounting said shaft in said support with said member rotatably supported adjacent the front of said support, a pendulum member mounted on the end of a shaft rotatably mounted in said tubular shaft with said pendulum member supported at the front of said support adjacent said driving member, each of said members having a pair of specimen engaging elements projecting outwardly in spaced relation parallel to the axis of rotation of said members, each of the elements of a pair being spaced equally on opposite sides of said axis, one pair of said elements being spaced outwardly beyond the other, an indicator on each member cooperating with one another to indicate relative deflection of said members and cooperating with a scale on said support, said driving member having two parts rotatable about said axis one of said parts carrying one pair of said elements and the other part carrying said indicator, said parts being adjustable to set said pair of elements thereon in relation to the other pair of elements according to the thickness of a specimen, and means on said pendulum member for retarding rotation thereof, said driving member being operable to bend a specimen engaged in transversely extending relation between said pairs of elements in opposite directions on opposite sides of said axis into substantially S-shape while said indicators will cooperate to indicate the elastic properties of said specimen when bent a given amount.

7. An instrument for measuring the elastic properties of materials having a pair of relatively movable members, means for retarding movement of one of said members relative to the other, one of said members having means for supporting one end of a test specimen of material of fixed size to be tested, a pair of projecting arms extending from the other member in spaced parallel relation, the combination of attachment means comprising a bending member having a shank mounted in said means of one of said members, a pair of spaced parallel bending elements projecting outwardly from said shank, a driving attachment having a supporting member mounted at opposite ends on said pair of projecting arms, a part slidable on said supporting member, means retaining said part in adjusted position, and a pair of spaced parallel drive elements projecting from said part in spaced parallel relation to said bending elements on opposite sides thereof for cooperation to receive a test specimen in engaged relation therewith, said members being operable to secure flexing of said strip in relative movement of said pairs of elements for indicating the elastic properties of said strip on a scale thereon when flexed a given amount, and said elements flexing opposite ends of said test specimen in opposite directions into substantial S-shape.

8. An attachment for instruments for measuring the properties of materials in flexure wherein the instrument has a support, a drive disc rotatably mounted on said support, a pendulum rotatably mounted on said support in coaxial relation with said drive disc and adjacent thereto, test specimen holding clamps on said pendulum, means for retarding rotation of said pendulum, and spaced parallel projections on said drive disc at opposite sides of said pendulum, comprising an attaching member mounted in said holding clamps, a pair of spaced parallel bending elements mounted on and projecting from said attaching member in parallel relation to and on opposite sides of the axis of rotation of said pendulum, a drive member having a supporting bar detachably mounted on said spaced parallel projections, a drive block slidably mounted on said supporting bar, a pair of drive elements mounted in spaced relation and projecting from said drive block in parallel relation to and on opposite sides of said bending elements, means for securing said drive block in adjusted position on said drive bar according to the thickness of a test specimen, said drive and bending elements receiving a test specimen in engaged relation therewith for bending said specimen at opposite ends in opposite directions into substantial S-shape by relative movement of said drive disc and pendulum for indicating the stiffness of said specimen on a scale on said support when said specimen is flexed a given amount.

9. An instrument for measuring the elastic properties of materials in flexure, comprising a support, a drive member on one end of a tubular shaft rotatable in said support, a pendulum hub mounted on the end of a pendulum shaft rotatable in said tubular shaft with said hub rotating in an opening in said drive member in coaxial relation, a deflection pointer extending radially from said hub through an aperture in said drive member with the free end cooperating with a scale on said support, a deflection indicator mounted on said drive member and extending radially with the free end cooperating with said pointer and scale, said drive member having a flange on said shaft and a drive head adjustable on a marginal portion of said flange, a pair of test specimen drive elements on opposite sides of said drive head, a pendulum head mounted on the front end of said pendulum hub, a pair of test specimen engaging elements on opposite sides of said pendulum head in spaced parallel and transversely aligned relation to said drive elements, a pendulum shaft adjustably mounted in said pendulum head in perpendicular relation to the axis of said shafts, a weight mounted on one end of said pendulum shaft, and thickness gauging means on said drive head and flange for determining the adjusted position of said drive head for testing a specimen according to specimen thickness, whereby rotation of said drive member with a test specimen engaged with said elements and said pendulum shaft length adjusted to a multiple of specimen thickness, the specimen will be flexed about said elements in opposite directions and said pointer will register the modulus of elasticity on said scale when said specimen is flexed a given amount as indicated on said deflection indicator.

10. An instrument for measuring the elastic properties of materials in flexure, comprising a support, a drive member on one end of a tubular shaft rotatable in said support, a pair of test specimen engaging elements mounted on and projecting forwardly from said drive head in spaced parallel equidistant relation to the axis of said shaft, a pendulum shaft rotatable in said tubular shaft in coaxial relation therein, a pendulum head mounted on the front end of said pendulum shaft in an aperture in said drive member, a pair of test specimen engaging elements on said pendulum head in equally spaced relation from said axis on opposite sides thereof for supporting a test specimen in transversely extending relation to said axis, indicating means on each of said shafts cooperating with a scale on said support, a pendulum weight having a shaft adjustably mounted in said pendulum head in transverse relation to said axis and means for adjusting said drive member relative to said indicating means to set said elements thereon relative to the elements on said pendulum head according to the thickness of a test specimen, whereby movement of said drive member about said axis will bend a test specimen about said pairs of elements in opposite directions on opposite sides of said axis and register the modulus of elasticity on said scale when said indicating means shows said specimen to be flexed a given amount with said pendulum shaft adjusted for a multiple of the thickness of said specimen.

References Cited in the file of this patent

UNITED STATES PATENTS

| | | |
|---|---|---|
| 1,573,865 | Robbins | Feb. 23, 1926 |
| 1,627,366 | Williams | May 3, 1927 |
| 2,049,235 | Tour | July 28, 1936 |
| 2,067,140 | Dinzl | Jan. 5, 1937 |
| 2,465,180 | Taber | Mar. 22, 1949 |